United States Patent [19]

Nelson

[11] Patent Number: 4,996,698
[45] Date of Patent: Feb. 26, 1991

[54] CLOCK SIGNAL RESYNCHRONIZING APPARATUS

[75] Inventor: Blaine J. Nelson, Plano, Tex.

[73] Assignee: Rockwell International Corporation, El Segundo, Calif.

[21] Appl. No.: 425,637

[22] Filed: Oct. 23, 1989

[51] Int. Cl.$^5$ ................. H04L 7/033; H04L 7/10
[52] U.S. Cl. ................................. 375/118; 375/112; 370/105.3
[58] Field of Search ............... 375/112, 118–120; 370/102, 105.3; 371/39.1, 42; 331/10

[56] References Cited

U.S. PATENT DOCUMENTS 3,420,956  1/1969  Heightley et al. ............... 370/102
4,716,575  12/1987  Douros et al. .................. 375/118

Primary Examiner—Douglas W. Olms
Assistant Examiner—Ralph Smith
Attorney, Agent, or Firm—Bruce C. Lutz; V. Lawrence Sewell; H. Fredrick Hamann

[57] ABSTRACT

When synchronous communication systems such as SONET (synchronous optical network) need to change data formats, the resulting periodically discontinuous clock signal associated with the data after overhead has been removed, has to be smoothed to a periodically continuous clock signal associated with resynchronized output data. The SONET format employs pointers which may be described as large phase hit error signals relative the clock signal. The present invention illustrates a technique for slowly integrating the large phase hit error signals into the clock smoothing process so that jitter in the smoothed clock output is held below previously obtainable limits. This is accomplished by high-pass filtering the large phase hit signal and summing it with the periodically discontinuous clock before applying it to a second order type 2 low-pass filter system which filter system employs phase locked loop synchronizing techniques. This total process operates as a low-pass filter to the large phase hits in the clock signal being resynchronized.

8 Claims, 1 Drawing Sheet

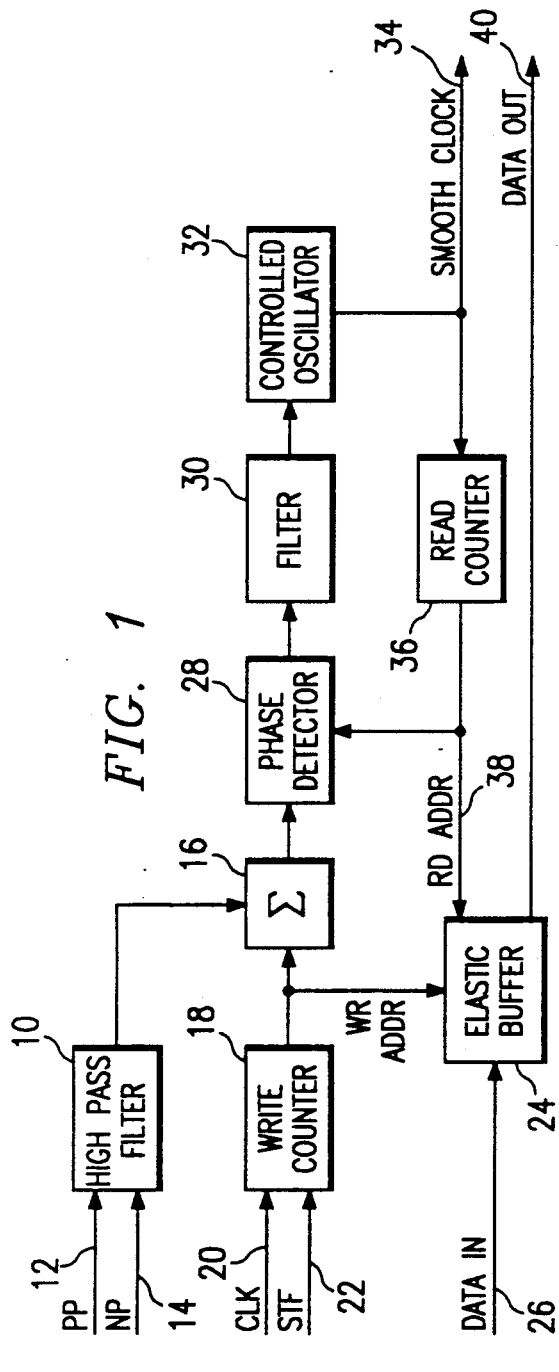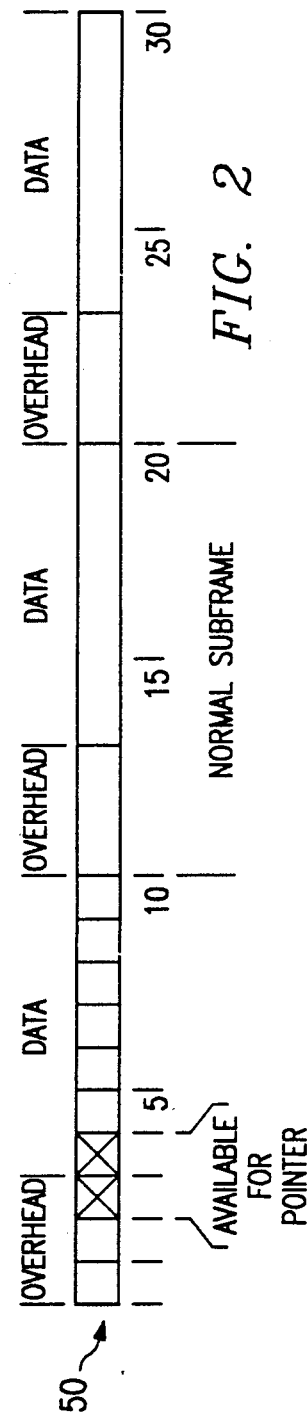

CLOCK SIGNAL RESYNCHRONIZING APPARATUS

THE INVENTION

The present invention is generally concerned with electronics and more specifically is directed to smoothing a clock signal. Even more specifically, the concept is directed towards the smoothing of a payload lock carried by a SONET (synchronous optical network) signal which has been pointer processed. The smoothing requires the reintegration of the pointer action clock bits into a clock signal when the data is reformatted from the SONET transport to the original data format.

BACKGROUND

The SONET system provides a mechanism for mapping asynchronous DSx (DS1, DS3 etc.) type signals into the SONET payload envelope. There are no restrictions made on the traffic content or type and the mapping does not require that the DSx be network synchronous. To accomplish synchronization of SONET signals at an asynchronous node, pointers comprising a byte or word of information (normally eight bits) are used to define the start of the next SONET payload envelope such that it may move relative the SONET frame. Since the pointer comprises eight consecutive bits of the "data" bit stream (overhead and traffic data), prior art clock smoothing techniques produce a smoothed clock with excessive jitter that will detrimentally affect downstream communication circuits. In other words, the jitter is enough that economically practical prior art or older downstream phase locked loops cannot maintain synchronization.

The present invention accomplishes the incorporation of the large phase hits into the clock signal stream to be smoothed in a gradual manner by rerouting a portion of the clock signal representing the phase hit information to a high-pass filter and summing the output of the high-pass filter with the stream of clock pulses to be smoothed. Thus, the phase hit clock signal information is removed from the clock signal stream being smoothed over a relatively long period of time as compared to the duration of a single cycle of the clock signal. The combined signals are applied to a type two second order low-pass filter in the form of a phase locked loop to produce or maintain the smoothed clock output. The effect of this rerouting and summing high-pass filter output has a total system effect which is the same as low-pass filtering the phase hit process. In other words, the effect of the phase hit on the smoothed clock output signal is slowly introduced over a long period of time. While it may at first glance appear confusing, the present invention is diverting clock signal pulses involved in the phase hit process, high-pass filtering these diverted pulses, and summing the diverted pulses with the remaining data correlated pulses to effect the process of low-pass filtering a phase hit function.

The incoming discontinuous and smoothed output clocks are used in conjunction with an elastic buffer to write data into the buffer and read data out such that the data out is properly time coordinated with the smoothed clock.

While DSx format signals have been mentioned specifically herein and the SONET system is designed to integrate many different types of signals simultaneously and the present concept is not limited to DSx type signals or to SONET but can be utilized in any resynchronizing application where there are large phase hits occurring on some low frequency basis as compared to the frequency of the clock and which large phase hits need to be incorporated into a smoothed clock output.

It is thus an object of the present invention to provide an improved resynchronizing apparatus for a clock signal.

Other objects and advantages of the present invention will be apparent from a reading of the specification and appended claims in conjunction with the drawings wherein:

FIG. 1 is a block diagram of the present concept; and

FIG. 2 comprises a representation of a portion of a data stream used in explaining the operation of FIG. 1.

DETAILED DESCRIPTION

In FIG. 1 a high-pass filter generally designated as 10 has positive pointer pulses (PP) supplied on a lead 12 and negative pointer pulses (NP) supplied on a lead 14. The high-pass filter 10 supplies signals to a summing means 16. A write counter 18 receives clock signals on a lead 20 and stuff false signals (STF) on a lead 22. (The STF signals prevent writing of a clock). An output of counter 18 is supplied to block 16 as well as providing write address inputs to an elastic buffer 24. Elastic buffer 24 receives data input signals (DATA IN) on a lead 26. The clock signal being supplied on lead 20 occurs on a periodic basis but the stuff false lad 22 supplies signals to prevent activation of the counter 18 except where data bytes (bits) supplied on lead 26 are to be resynchronized and output from buffer 24. An output of summing means 16 is supplied to a phase detector 28 which supplies signals to a filter 30 having a Laplace response characteristic from input to output of $(-K/s)*(1+s/S_1)/(1+s/S_2)$ where s is the Laplace transform operator and $S_1$ and $S_2$ and K are constants. The output of filter 30 is supplied to a controlled oscillator 32. The phase detector 28 detects the phase of the two inputs and produces, in one embodiment of the concept, a pulse width modulated signal which is integrated by filter 30 to provide a control signal to a voltage controlled oscillator incorporated within block 32. The output of the oscillator is a periodically continuous clock signal representing the smoothed clock version of the combination of signals supplied on lead 20 less the stuff signals on lead 22, and in addition, the negative or positive pointers supplied on leads 12 and 14 as modified by the filter 10. The output of oscillator 32 is supplied on a lead 34 as an apparatus output and is also used to activate a read counter 36. An output of read counter 36 is supplied on a lead 38 both to phase detector 28 as a feedback signal and as a read address input to elastic buffer 24. The blocks 28, 30, 32, and 36 comprises a phase locked loop and the operation on the signal from the input to phase detector 28 as received from summing means 16 to the output on lead 34 operates in accordance with the transfer function of a second order type 2 low-pass filter. The read address signals on lead 38 cause data to be output from elastic buffer 24 on a lead 40.

While the various data leads shown in FIG. 1 are all drawn identically, the two inputs to the summing means 16 were buses in one embodiment of the invention so that two words could be quickly added, and to provide the write address to the buffer 24 in a parts efficient manner. Although a similar bus is output from the read counter 36, only the most significant bit is used in the phase detector 28 along with the single bit from summing means 16.

FIG. 2 illustrates a data stream and associated clock signals where a series of blocks are generally labeled 50. A first section comprising three byte time periods is labeled OVHD for overhead data. Each set of time periods is in one embodiment of the invention typically designated as a byte and in one embodiment, a byte comprised eight clock pulses. The next segment from time period 4 to time period 10 comprises a section labeled data and the space of an overhead and a data portion as illustrated, comprises ten bytes and is otherwise often labeled as a subframe. The space from the eleventh byte to the twentieth byte is an additional subframe. While typically positions 4 through 10 contain data, the third and fourth positions in this subframe are available for accomplishing the phase hit adjustments and thus, are labeled as being available for pointer information. When points occur, a situation can occur where the fourth byte period of the subframe doesn't contain data thereby requiring a reduction in the frequency of the smoothed output clock. A negative pointer can cause the third byte position of the subframe, which typically does not ever contain data, to contain data as well as there being data in the fourth byte of the subframe.

It should be realized that although the portion of the subframe devoted to data is shown to be only slightly longer than the portion devoted to overhead so that the concept can be illustrated, in normal practice the number of bytes devoted to data as compared to those devoted to overhead in a subframe would be much larger.

OPERATION

Pointers were introduced in the SONET (synchronous optical network) system as a mechanism whereby diurnal phase changes (daily changes in the propagation decay of an optical fiber) can be accommodated as well as frequency differences at equipment interfaces. In a normal data stream subframe, the information contained in the bytes designated as overhead are not written to the elastic buffer 24. Only data is written to the buffer 24. Thus, the STF signal on lead 22 tells the counter 18 not to increment during the twenty four bit time periods comprising the three bytes of overhead for a normal subframe. Since the counter is not incrementing, the overhead logic bits appearing on the input stream of the DATA IN lead 26 are being refused by the elastic buffer 24.

In the case of a positive pointer, the fourth byte (shown as X in FIG. 2) of the subframe is used for overhead instead of data. While the length of the subframe remains constant, the amount of data carried by that subframe is necessarily reduced by one byte. If no compensating action were taken, the read counter 36 would continue reading out data from the elastic buffer as if the input flow of data had never been reduced. Depending upon the size of the elastic buffer and the normal address separation between read and write operations, a number of positive pointers would cause the read counter to be reading the wrong information from the elastic buffer (i.e., reading data bits previously read). Thus, as each positive pointer is received, the read counter needs to be modified so as to maintain a desired differential in the bit being read as compared to the most recent bit being written in the internal addressing of the elastic buffer by the read counter for outputting data on lead 40. This operation is accomplished by the phase locked loop comprising detector 28, filter 30 and controlled oscillator 32. If the phase locked loop were receiving the signal output by write counter 18 directly, the resulting change in frequency at output 34 would occur so fast that downstream equipment would be aversely affected. (The downstream equipment may lose synchronism because it was designed for less stringent conditions.) Thus, the present invention attempts to reduce the effect of the pointer alternation or phase hit information as seen by the phase locked loop. This is accomplished by supplying a signal on lead 12 or 14 depending upon whether a positive or negative pointer has occurred. The effect of a positive pointer on lead 12 of the high-pass filter 10, representing the omission of one full byte of data in the subframe of FIG. 2 will effectively instantaneously supply the count to summing means 16 that is lacking from write counter 18 due to the stuff signal appearing on lead 22 during the fourth byte of the subframe. Thus, as far as the phase locked loop is concerned, there has been not change. However, the output of a high-pass filter will, over a period of time, decay to zero after receiving a step input. Thus, over a period of time, the output from the summing means 16 will represent only the output of write counter 18.

While the operation has been described for positive pointers, a reasonably similar set of circumstances occur for negative pointers where the frequency of the phase locked loop has to be raised slightly over a period of time until there are no further inputs from high-pass filter 10.

The present concept is merely designed to minimize the absolute value of frequency change and effectively spread out the time over which this frequency change has occurred so as to minimize the possibility of loss of synchronism by downstream circuitry. Once there is no further input from high-pass filter 10, the phase locked loop portion of FIG. 1 will return to the frequency that existed prior to the occurrence of the positive pointer or negative pointer in the first place.

Although the description has been provided on the basis of receiving a single pointer signal and the system returning to a stable state prior to receipt of a further pointer, the system as designed, is able to accumulate the effects of pointers such that it will operate with as many as one pointer every fourth frame.

While I have described a single embodiment of apparatus for resynchronizing a clock signal which is periodically discontinuous due to the removal of varying amounts of overhead bits, I wish to be limited only to the concept of summing a high-pass filtered indication of the phase hit with the clock signals remaining after the removal of overhead bits to effect a low-pass filtering process of the signals to be applied to a phase locked loop as claimed in the appended claims wherein I claim:

1. Apparatus for smoothing elastic buffer read/write phase hits of multiple bits comprising, in combination:
    elastic buffer first means, including data, write address and read address inputs and a data output, for storing data input written to an address provided until output in response to a provided read address;
    summation second means, including first and second input means and output means, for summing the inputs to a combined output;
    write counter third means, connected to said first and second means, for supplying write address outputs to said first and second means;

phase detector fourth means, connected to said output means of said second means and including feedback means and apparatus clock output means, for providing a smoothed clock output means in response to differences between signals received via said feedback means and from said summation second means; and read counter fifth means, connected between said apparatus clock output means of said fourth means and both the read input of said elastic buffer first means and the feedback input of said fourth means, for supplying a continuous count of the clock signal appearing at the apparatus clock output the fifth means and the fourth means providing the function of a phase locked loop.

2. Apparatus as claimed in claim 1 wherein:

said phase detector means comprises additionally filter means and controlled oscillator means wherein the result of the phase detection is filtered and used to control the frequency of operation of the controlled oscillator providing output signals from said phase detector means.

3. The method of smoothing an incoming data signal synchronized clock signal pulse where the data is substantially periodically discontinuous for times longer than the period of a data clock signal pulse and further phase hit adjustments of longer than the period of a data clock signal need to be made on a periodic basis comprising the steps of:

a. high-pass filtering phase hit adjustment signals to produce first signals;
b. summing said first signals and periodically discontinuous clock signals to produce second signals;
c. phase detecting said second signals and a feedback signal to produce a third signal;
d. filtering said third signal to generate a fourth signal whose response transform complies with $V_o/V_{in} = (-K/s)*(1+s/S_1)/(1+s/S_2)$ where s is the Laplace transform operator and $S_1$ and $S_2$ and K are constants;
e. controlling a controlled oscillator means with said fourth signal to produce a smoothed clock fifth signal; and
f. supplying a feedback signal indicative of the frequency of said fifth signal to be used in the phase detection of step (c).

4. The method of resynchronizing an incoming clock signal ranging about an average frequency and a further correction signal causing phase hit adjustments to the clock signal of longer than the period of a single cycle of said clock signal comprising the steps of:

high-pass filtering a phase hit adjustment first signal to produce a second signal;
summing said second signal and a periodically discontinuous third signal to produce a fourth signal; and
type two second order low-pass filtering said fourth signal as part of a phase lock loop to generate a periodically continuous fifth signal whose frequency is indicative of the sum of said second and third signals.

5. The method of resynchronizing data associated with an incoming clock signal ranging about an average frequency and a further correction signal causing phase hit adjustments to the clock signal of longer than the period of a single cycle of said clock signal comprising the steps of:

high-pass filtering a phase hit adjustment first signal to produce a second signal;
writing data into an elastic buffer in accordance with the occurrence of a clock third signal;
summing said second signal and said third signal and phase detecting the result to produce a fourth signal;
second order type 2 low-pass filtering said fourth signal to generate a periodically continuous fifth signal whose frequency is indicative of the sum of said second and third signals; and
reading data from the elastic buffer in accordance with said fifth signal to produce a periodically continuous data stream.

6. The method of claim 5 wherein the data and the clock third signal are periodically discontinuous.

7. Apparatus for resynchronizing an incoming clock signal ranging about an average frequency and a further correction signal causing phase hit adjustments to the clock signal of longer than the period of a single cycle of said clock signal comprising, in combination:

signal supplying first means for supplying a phase hit adjustment first signal;
high-pass filtering second means, connected to said first means to receive said first signal, for generating a filtered second signal;
clock signal supplying third means for supplying a third signal;
summing fourth means, connected to said second and third means, for summing said second signal and said third signal to produce a fourth signal; and
second order type 2 low-pass filtering phase lock loop fifth means, connected to said fourth means to receive said fourth signal, said fifth means operating to generate a periodically continuous fifth signal whose frequency is indicative of the sum of said second and third signals.

8. Apparatus for resynchronizing an incoming clock signal ranging about an average frequency and a further correction signal causing phase hit adjustments to the clock signal of longer than the period of a single cycle of said clock signal comprising, in combination:

periodically discontinuous clock signal first means for supplying a first signal;
phase hit adjustment signal second means for supplying a phase hit adjustment second signal;
high-pass filtering third means, connected to said second means to receive said second signal therefrom, for providing a high-pass filtered third signal;
summing fourth means, connected to said first and third means, for summing said first and third signals to produce a fourth signal; and
second order type 2 low-pass filtering phase lock loop fifth means, connected to said fourth means, for processing said fourth signal to generate a periodically continuous fifth signal whose frequency is indicative of the sum of said first and third signals.

* * * * *